(12) United States Patent
Lee et al.

(10) Patent No.: US 6,887,380 B2
(45) Date of Patent: May 3, 2005

(54) SILICONE-COATED ORGANIC SOLVENT RESISTANT POLYAMIDE COMPOSITE NANOFILTRATION MEMBRANE, AND METHOD FOR PREPARING THE SAME

(75) Inventors: Kew-Ho Lee, Daejeon (KR); In-Chul Kim, Daejeon (KR); Hyung-Gu Yun, Kwangju (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 323 days.

(21) Appl. No.: 10/147,071

(22) Filed: May 17, 2002

(65) Prior Publication Data

US 2003/0098274 A1 May 29, 2003

(30) Foreign Application Priority Data

Oct. 19, 2001 (KR) ........................................ 2001-64598

(51) Int. Cl.[7] .............................................. B01D 39/00
(52) U.S. Cl. ..................... 210/500.38; 210/490; 96/4; 96/14; 264/41; 264/45.1; 427/244; 427/245
(58) Field of Search ............................ 210/500.38, 490, 210/640, 652, 654; 96/6, 14; 95/45; 264/41, 45.1; 427/244, 245

(56) References Cited

U.S. PATENT DOCUMENTS

| | | | |
|---|---|---|---|
| 4,891,135 A | * | 1/1990 | Haubs et al. .......... 210/500.38 |
| 5,030,282 A | | 7/1991 | Matsuhashi et al. |
| 5,194,158 A | * | 3/1993 | Matson ........................... 95/46 |
| 5,562,826 A | * | 10/1996 | Schneider et al. .......... 210/490 |
| 5,928,409 A | * | 7/1999 | Sirkar ............................ 95/45 |
| 6,113,794 A | | 9/2000 | Kumar et al. |

OTHER PUBLICATIONS

In–Chul Kim, et al.; "Preparation of Silicone–Coated Nanofiltration Membrane for Non–Aqueous Solution Separation", Membranes and Separation Research Center, Korea Research Institute of Chemical Technology, pp. 80–83, (2001).

* cited by examiner

Primary Examiner—Ana Fortuna
(74) Attorney, Agent, or Firm—Finnegan, Henderson, Farabow, Garrett & Dunner, LLP

(57) ABSTRACT

The present invention relates to a silicone-coated organic solvent resistant polyamide composite nanofiltration membrane and a method for preparing the same. More particularly, the present invention relates to a nanofiltration composite membrane that is not only rejection rate superior but also organic solvent stable and flux excellent, prepared by coating with silicone during the process of interfacial polymerization of polyamide on the surface of porous support; and a method for producing it.

6 Claims, No Drawings

SILICONE-COATED ORGANIC SOLVENT RESISTANT POLYAMIDE COMPOSITE NANOFILTRATION MEMBRANE, AND METHOD FOR PREPARING THE SAME

FIELD OF THE INVENTION

The present invention relates to a silicone-coated organic solvent resistant polyamide composite nanofiltration membrane and a method for preparing the same. More particularly, the present invention relates to a nanofiltration composite membrane that is not only rejection rate superior but also organic solvent stable and flux excellent, prepared by coating with silicone during the process of interfacial polymerization of polyamide on the surface of porous support; and a method for producing it.

BACKGROUND OF THE INVENTION

It is reported that materials used for solvent resistant membranes are cross-linked organic polymers, ceramics or inorganic compounds. However, these materials are often expensive and are limited to ultrafiltration or microfiltration, not available in the nanofiltration range. Polymeric materials used for nanofiltration membranes generally swell in organic solvents. The swelling of such membranes in the presence of solvents and under pressure usually results in compaction and loss of flux and performance. Due to hydrophobicity of these materials, most of organic solvents may result in significant loss of flux in an application of polyamide nanofiltration composite membranes for the treatment of water. The conventional nanofiltration composite membranes, therefore, are incongruent in the areas of food technology, the treatment of waste streams, chemical process, and petrochemical industry. Hydrophobic nanofiltration composite membrane having organic solvent resistance which is called 'Membrane D' produced by Membrane Osmonics Co. has been commercialized but has poor rejection rate due to flexibility of silicone.

There are references relating to organic solvent resistant separation membranes as follows. U.S. Pat. No. 5,032,282 discloses that composite membranes are organic solvent resistant but they have high permeation of aqueous solution due to hydrophilic surface property of the membranes, thus resulting in poor permeation of organic solvents. U.S. Pat. No. 6,113,794 discloses that composite nanofiltration membranes coated with chitosan which is hydrophilic have excellent resistant in various organic solvents. However, fluxes of other solvents were much lower than that of water and especially hexane flux was not observed. Therefore, the composite membrane disclosed in U.S. Pat. No. 6,113,794 is not suitable for hydrophobic solvents.

On the other hand, the nanofiltration composite membrane of the present invention is stable in various solvents, which has been proved by investigating the solvent permeation behavior through the membrane, and provides high permeation of hydrophobic solvents and good rejection rate of an organic compound dissolved in an organic solvent.

SUMMARY OF THE INVENTION

Nanofiltration composite membrane of the present invention is composed with skin layer blended with silicone and polyamide on the surface of a porous support, wherein said porous support is formed to support the skin layer and said skin layer is formed by coating a polymer prepared by condensing diamine monomer and dicarboxylic acid and simultaneously having repetitive siloxane. The nanofiltration composite membrane of the present invention, thus, provides excellent resistance against most of organic solvents, high flux and separation efficiency.

Accordingly, an object of the present invention is to provide a polyamide nanofiltration composite membrane which has excellent separation efficiency of small molecular organic compounds in organic solvent media, and excellent permeation rate toward an organic solvent. In accordance with one object of the present invention, there is provided a method for preparing the same.

DETAILED DESCRIPTION OF THE INVENTION

The present invention is characterized by a silicone-coated organic solvent resistant polyamide composite nanofiltration membrane. Further, the present invention is characterized by a method for preparing a silicone-coated organic solvent resistant polyamide composite nanofiltration membrane by coating silicone and polyamide prepared by interfacial polymerization of diamine monomer and dicarboxylic acid on the surface of the porous support to form a skin layer.

The present invention is described in more detail hereunder. The skin layer of the nanofiltration composite membrane may be supported by a porous support. Most of porous supports used for conventional composite membranes may be applied to this invention. Particularly, polyacrylonlitrile support having a number-average molecular weight of 50,000 may be preferable in view of organic solvent resistance and molecular weight cut-off of the polyacrylonitrile support is polyethylene glycol (PEG) 50,000.

A method is provided for producing a composite nanofiltration membrane comprising:

(a) casting a polymer solution obtained by dissolving polyacrylonitrile in N-methyl-2-pyrrolidone on the non-woven fabric to form a polyacrylonitrite ultrafiltration membrane support;

(b) coating with silicone and polyamide on the surface of the obtained porous support under a certain condition to form a skin layer, wherein said silicone is polydinmethylsiloxane and polyamide is prepared by interfacial polymerization of diamine monomer and dicarboxylic acid;

(c) drying the result at room temperature or high temperature; and (d) impregnating in an aqueous ethanol solution to obtain nano pore sizes.

Diamine monomer used for the interfacial polymerization to produce polyamides is selected from at least one from monomers used for conventional polyamide polymerization such as aromatic diamines, aliphatic diamines, and aliphatic cyclodiamines. Examples of aromatic diamines include 2,4-diaminotoluene, 2,4-diaminobenzoic acid, p-phenylene diamine, m-phenylene diamine, 1,3,5-triaminobenzene, and amidol. Examples of aliphatic diamines include ethylene diamine and propylene diamine. Examples of aliphatic cyclodiamines include piperazine, 1,3-diaminocyclohexane and 1,4-diaminocyclohexane.

Dicarboxylic acid monomer used for the interfacial polymerization to produce polyamides is selected from at least one from monomers used for conventional polyamide polymerization such as dicarboxylic acids, carboxylic dianhydrides, diacyl halides. Diacyl halide is aromatic or aliphatic compounds having at least 2 acyl halides, where examples of the aromatic acyl halide include trimesoyl chloride, terephthaloyl chloride, and isophthaloyl chloride; and examples of the aliphatic acylhalide include cyclobutanecarbonyl chloride, cyclopentanecarbonyl chloride, cyclohexanecarbonyl chloride, cyclobutanetricarbonyl chloride, and cyclobutanetetracarbonyl chloride.

Further, polyisocyanate or silica-containing cross-linking agent may be added in the interfacial polymerization.

The present invention is also characterized by the formation of the skin layer by coating with the polyamide prepared by interfacial polymerization and simultaneously with silicone, wherein the silicone is preferable to have a number-average molecular weight of 400–200,000, more preferably polydimethylsiloxane.

The formation process of the skin layer is described in more detail hereunder. A porous support is impregnated in an aqueous diamine solution containing 0.1–10 wt. % of a diamine monomer and further impregnated in an isoparaffin solution containing 0.005–5 wt. % of a dicarboxylic acid and 0.1–3 wt. % of silicone. The impregnated porous support is dried at in the range of room temperature to 70° C., and finally impregnated in 10–80 wt. % of an aqueous ethanol solution to produce the desired nanofiltration composite membrane. A module of nanofiltration composite membrane is selected from the group consisting of spiral wound type, immersed flat sheet type, rotary flat sheet type and plate-and-frame. Thus, the nonofiltration composite membrane of the present invention has high rejection rate and flux as well as excellent organic solvent resistance.

The following examples are intended to further illustrate the present invention without limiting its scope.

EXAMPLE 1

An aqueous solution containing 0.25 wt. % of m-phenylenediamine, 0.25 wt. % of triethylamine, 0.5 wt. % of diethylene glycol dimethyl ether and 0.001 wt. % of sodium dodecylsulfate was prepared. The prepared aqueous solution was contacted with the surface of a porous polyacrylonitrile support for several minutes and then any extra aqueous solution was removed. Then, isoparaffin solution containing 0.0125 wt. % of trimesoyl chloride and 2 wt. % of polydimethylsiloxane was contacted with the surface of the porous support for several minutes and thereafter held for several hours in a dry oven at a temperature of 90° C. Consequently, a composite membrane containing polyamide and silcone on the surface thereof was obtained. The composite membrane was impregnated in 50 wt. % of an aqueous ethanol solution for several seconds.

EXAMPLE 2

A composite membrane was produced by the same procedure as that of yyy m Þ<Þ<Þ|Þ|Þ|Þ|Þ|Á-Á>â?Y u yy Example 1 except j phenylenediamine as a diamine monomer.

COMPARATIVE EXAMPLE 1

A composite membrane was produced by the same procedure as that of Example 1 except that polydimethylsiloxane was not added.

COMPARATIVE EXAMPLE 2

A composite membrane was produced by the same procedure as that of Example 1 except that the aqueous diamine solution and acyl halide were not added.

EXPERIMENTAL EXAMPLE 1
Evaluation of a Flux and Rejection Rate

Organic feed solution containin 1000 pm oleic acid in hexane was used for solute rejection rate (%) and pure solvent flux (m3/m2·day). The flux and rejection rate were measured at 200 psi and 25° C. and evaluated by employin the followin equations 1 and 2. The result was summarized in Table 1.

Rejection rate (%)=(conc. of feed solution−conc. of permeated solution)/conc. of feed solution×100    Equation 1

$$\text{Flux rate } (m^3/m^2 \cdot day) = \frac{fluxed\ amount}{area\ of\ membrane\ x\ unit\ time}.\quad \text{Equation 2}$$

TABLE 1

| Composite membrane | Flux (m³/m² · day) | Rejection rate (%) |
|---|---|---|
| Example 1 | 3.0 | 93 |
| Example 2 | 4.1 | 76 |
| Comparative Example 1 | 0.2 | 68 |
| Comparative Example 2 | 5.0 | 13 |

EXPERIMENTAL EXAMPLE 2
Evaluation of a Flux and Rejection Rate

A composite membrane was produced by the same procedure as that of Example 1, except that concentration of polydimethylsiloxane(PDMS) was fixed at 2 wt. %, concentration of ni-phenylenediamine(MPD) was increased to 0.5 wt. %, 1 wt. % and 2 wt. %, and concentration of trimesoyl chloride(TMC) was increased to 0.025 wt. %, 0.05 wt. % and 0.1 wt. %. Flux and rejection rate of the obtained composite membrane was evaluated by the same procedure as that of Experimental Example 1. The result was summarized in Table 2.

TABLE 2

| Conc. of PDMS: 2 wt. % | | | |
|---|---|---|---|
| Conc. of MPD | Conc. of TMC | Flux (m³/m² · day) | Rejection rate (%) |
| 0.5 wt. % | 0.025 wt. % | 1.23 | 94 |
| 1.0 wt. % | 0.05 wt. % | 0.53 | 94 |
| 2.0 wt. % | 0.1 wt. % | 0.31 | 96 |

EXPERIMENTAL EXAMPLE 2
Evaluation of a Flux and Rejection Rate

A composite membrane was produced by the same procedure as that of Example 1, except that concentration of m-phenylenediamine(MPD) was fixed at 0.25 wt. %, concentration of trimesoyl chloride(TMC) was fixed at 0.0125 wt. % and polydimethylsiloxane(PDMS) was increased to 0.2 wt. % and 1 wt. %. Flux and rejection rate of the obtained composite membrane was evaluated by the same procedure as that of Experimental Example 1. The result was summarized in Table 3.

TABLE 3

| Conc. of MPD: 0.25 wt. %, Conc. of TMC: 0.0125 wt. % | | |
|---|---|---|
| Conc. of PDMS | Flux (m³/m² · day) | Rejection rate (%) |
| 0.2 | 0.5 | 76 |
| 0.5 | 1.1 | 87 |
| 1.0 | 2.5 | 93 |

EXPERIMENTAL EXAMPLE 4
Evaluation of a Flux and Rejection Rate of Dye and Oil Flux and rejection rate of Sudan IV dye and oil in which wax was removed of the composite membrane obtained in Example 1 was evaluated by the same procedure as that of Experimental Example 1. The result was summarized in Table 4.

TABLE 4

| Solute | Flux (m³/m² · day) | Rejection rate (%) |
|---|---|---|
| Sudan IV dye | 3.0 | 95 |
| Oil | 3.0 | 93 |

EXPERIMENTAL EXAMPLE 5
Evaluation of a Flux and Rejection Rate of Solvent

Flux and rejection rate of the composite membrane obtained in Example 1 was evaluated for water (H$_2$0), methanol (MeOH), ethanol (EtOH), esopropanol (IPA), acetone, methylethyl ketone (MEK), methyl t-butyl ether (MTBE), ethylacetate (EA), diethyl ether (DEE), hexane by the same procedure is that of Experimental Example 1. The result was summarized in Table 5.

TABLE 5

| Solvent | H$_2$0 | MeOH | EtOH | IPA | acetone | MEK | MTBE | EA | DEE | hexane |
|---|---|---|---|---|---|---|---|---|---|---|
| Flux (m$^3$/m$^2$ · day) | 0.09 | 1.75 | 1.29 | 0.88 | 2.58 | 1.95 | 2.92 | 2.81 | 4.55 | 3.00 |
| Rejection rate (%) | – | 95 | 90 | 87 | 95 | 95 | 95 | 93 | 91 | 93 |

As described above, the polyamide nanofiltration composite membrane of the present invention has high flux and rejection rate. Further, the composite membrane is stable against various organic solvents and has excellent separation efficiency. Particularly, the nanofiltration composite membrane of the present invention is useful for purification of organic solvents and treatment of organic solvent waste and further for recovery of organic solvents having a low molecular weight of 100–1000. Thus, the nanofiltration composite membrane of the present invention may be widely applicable to petrochemical industry to separate oil, recover expensive catalysts, separate medicines and toxic compounds, and the like.

What claimed is:

1. An organic solvent resistant polyamide nanofiltration composite membrane comprising a porous support and a skin layer containing polyamide and silicone.

2. An organic solvent resistant polyamide nanofiltration composite membrane according to claim 1, for separation of a compound having a low molecular weight of 100–1000 dissolved in an organic solvent.

3. A process for preparing organic solvent resistant polyamide nanofiltration composite membrane by coating with silicone during the step of interfacial polymerization of diamine monomer and dicarboxylic acid monomer on the surface of a porous support to form the skin layer.

4. A process for preparing organic solvent resistant polyamide nanofiltration composite membrane according to claim 3, wherein each concentration of said diamine monomer, dicarboxylic acid monomer, and silicone-coated polymer is 0.1–10 wt. %, 0.005–5 wt. %, and 0.1–3 wt. %.

5. A process for preparing organic solvent resistant polyamide nanofiltration composite membrane according to claim 3, wherein said porous support is polyacrylonitrile ultrafiltration membrane.

6. A process for preparing organic solvent resistant polyamide nanofiltration composite membrane according to claim 3, wherein said silicone is polydimethylsiloxane.

* * * * *